(12) United States Patent
Resende et al.

(10) Patent No.: US 8,139,502 B2
(45) Date of Patent: Mar. 20, 2012

(54) METHOD AND SYSTEM FOR NETWORK MIGRATION SCHEDULING

(75) Inventors: Mauricio Guilherme de Carvalho Resende, Holmdel, NJ (US); Diogo Vieira Andrade, Piscataway, NJ (US)

(73) Assignee: AT & T Intellectual Property I, LP, Atlanta, GA (US)

( * ) Notice: Subject to any disclaimer, the term of this patent is extended or adjusted under 35 U.S.C. 154(b) by 1116 days.

(21) Appl. No.: 11/967,640

(22) Filed: Dec. 31, 2007

(65) Prior Publication Data
US 2009/0168665 A1    Jul. 2, 2009

(51) Int. Cl.
  *H04L 12/28* (2006.01)
  *H04L 12/26* (2006.01)
  *H04L 12/54* (2006.01)
  *H04L 12/56* (2006.01)
  *G06F 15/177* (2006.01)
  *G06F 15/173* (2006.01)

(52) U.S. Cl. ........ 370/254; 370/248; 370/412; 370/413; 370/414; 370/415; 370/416; 370/428; 370/429; 709/220; 709/221; 709/223

(58) Field of Classification Search .................. 370/254, 370/248, 412–416, 428, 429; 709/220, 221, 709/223
See application file for complete search history.

(56) References Cited

U.S. PATENT DOCUMENTS

| | | | |
|---|---|---|---|
| 6,240,463 B1 * | 5/2001 | Benmohamed et al. | 709/238 |
| 7,085,242 B2 | 8/2006 | Liu | |
| 7,127,581 B2 * | 10/2006 | Watanabe | 711/165 |
| 7,209,975 B1 * | 4/2007 | Zang et al. | 709/238 |
| 7,272,127 B2 | 9/2007 | Wada et al. | |
| 7,751,549 B1 * | 7/2010 | Dianda | 379/224 |
| 2004/0114588 A1 * | 6/2004 | Bhaskaran | 370/389 |
| 2005/0055697 A1 | 3/2005 | Buco et al. | |
| 2006/0239187 A1 * | 10/2006 | Durand et al. | 370/229 |
| 2007/0118643 A1 | 5/2007 | Mishra et al. | |

* cited by examiner

*Primary Examiner* — Melanie Jagannathan
*Assistant Examiner* — Kai Chang
(74) *Attorney, Agent, or Firm* — Fay Kaplun & Marcin, LLP

(57) ABSTRACT

A method of transforming an ordered list of nodes of a network into one of a plurality of elite ordered lists, the ordered list corresponding to a deloading sequence, the deloading sequence including a temporary capacity requirement, each of the elite ordered lists corresponding to an elite deloading sequence including an elite temporary capacity requirement by generating at least one intermediate ordered list corresponding to an intermediate deloading sequence including an intermediate temporary capacity requirement, selecting one of the intermediate ordered list and the ordered list based on a comparison of the intermediate temporary capacity requirement and the temporary capacity requirement and replacing one of the elite ordered lists with the one of the intermediate ordered list and the ordered list if a value corresponding to one of the intermediate temporary capacity requirement and the temporary capacity requirement is less than a lowest value of the elite temporary capacity requirements.

20 Claims, 2 Drawing Sheets

METHOD AND SYSTEM FOR NETWORK MIGRATION SCHEDULING

BACKGROUND

Replacement of outdated communications networks with modern networks improves the functionality of communications. Such replacement may be done by substituting one node at a time in a predetermined order. When nodes are replaced, temporary communications links must be established so that nodes that have been upgraded to new technology may communicate with nodes that have not yet been upgraded and vice versa. By minimizing the requirements for temporary communications links, the cost of the upgrading process may be optimized.

SUMMARY OF THE INVENTION

A method of transforming an ordered list of nodes of a network into one of a plurality of elite ordered lists, the ordered list corresponding to a deloading sequence of the nodes from the network, the deloading sequence including a temporary capacity requirement, each of the elite ordered lists corresponding to an elite deloading sequence including an elite temporary capacity requirement by benerating at least one intermediate ordered list corresponding to an intermediate deloading sequence including an intermediate temporary capacity requirement, selecting one of the intermediate ordered list and the ordered list based on a comparison of the intermediate temporary capacity requirement and the temporary capacity requirement and replacing one of the elite ordered lists with the one of the intermediate ordered list and the ordered list if a value corresponding to one of the intermediate temporary capacity requirement and the temporary capacity requirement is less than a lowest value of the elite temporary capacity requirements.

A system to transform an ordered list of nodes of a network into one of a plurality of elite ordered lists, the ordered list corresponding to a deloading sequence of the nodes from the network, the deloading sequence including a temporary capacity requirement, each of the elite ordered lists corresponding to an elite deloading sequence including an elite temporary capacity requirement. The system having a memory storing the ordered list of nodes and the elite ordered lists and a processor generating at least one intermediate ordered list corresponding to an intermediate deloading sequence including an intermediate temporary capacity requirement, selecting one of the intermediate ordered list and the ordered list based on a comparison of the intermediate temporary capacity requirement and the temporary capacity requirement, and replacing one of the elite ordered lists with the one of the intermediate ordered list and the ordered list if a value corresponding to one of the intermediate temporary capacity requirement and the temporary capacity requirement is less than a lowest value of the elite temporary capacity requirements.

DETAILED DESCRIPTION

Figure 1A:
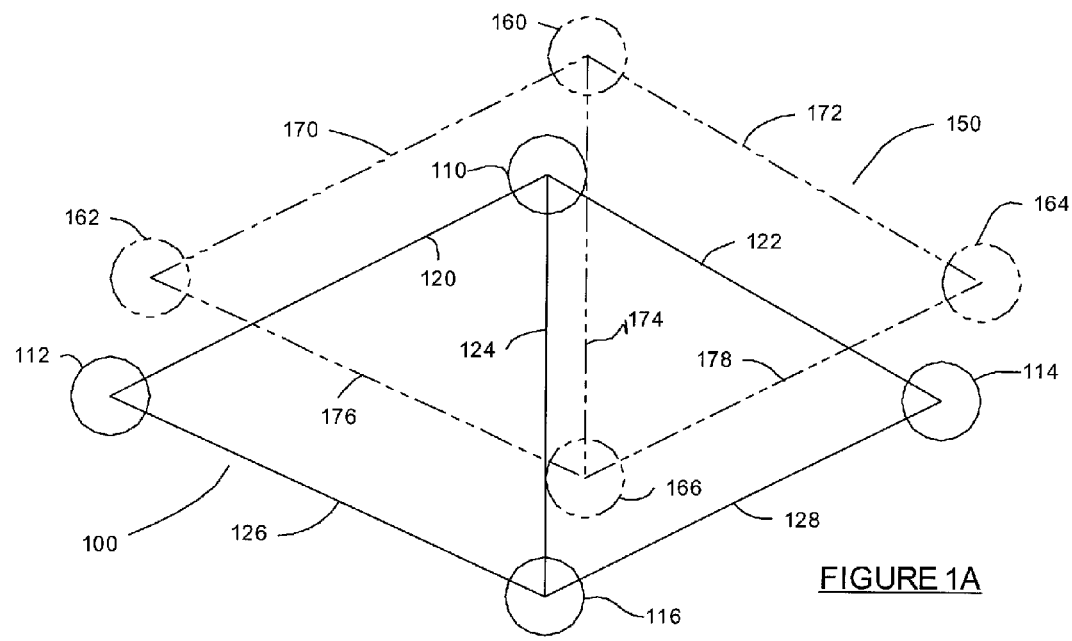
FIGS. 1A and 1B show exemplary network diagrams according to the present invention.

The exemplary embodiments of the present invention may be further understood with reference to the following description and the appended drawings, wherein like elements are referred to with the same reference numerals. The exemplary embodiments of the present invention describe systems and methods for diagnosing problems with network hardware.

The exemplary embodiments of the present invention present methods and systems for optimizing the process of migrating a data network from outdated technology to newer technology. A network may comprise a number of nodes and arcs connecting the nodes to one another. For example, in a switch-based network, a node may be a switch and an arc may be a trunk connecting two switches; in an IP network, a node may be a router and an arc may be an IP path connecting two routers. During the process of upgrading an outdated network to a new network (e.g., upgrading a switch-based network to an IP-based network), nodes may be deloaded one at a time. Deloading is the process of turning off a node in the old network (e.g., a switch of a switch-based network) and moving all of the traffic that originates or terminates in that node to a specified node in the new network (e.g., a router of an IP-based network).

During the migration process, both the old network and the new network may be functioning simultaneously. In this situation, there may be some traffic within the old network, some traffic within the new network, and some traffic between the two networks. To accommodate the traffic between the two networks, capacity must temporarily be made available in the arcs linking the two networks. The amount of capacity that must be made available may depend on the sequence in which the switches are deloaded. The exemplary embodiments of the present invention provide for determining a deloading sequence that may minimize this amount of capacity. Minimization is desirable in order to reduce the amount of temporary capacity that must be built, and thus reduce the cost of the migration process.

The exemplary embodiments of the present invention utilize a greedy randomized adaptive search procedure ("GRASP") with path-relinking. The inputs to this procedure may include the set of all nodes in the network, the set of all arcs between nodes in the network, and the capacity of each arc. The output may be a sequence specifying the order in which the nodes may optimally be deloaded.

FIG. 1A illustrates an exemplary set of networks according to the present invention. A first network 100 may be outdated, while a second network 150 may be replacing the first network 100. The first network 100 may include nodes 110, 112, 114 and 116; as discussed above, the nodes of the first network 100 may be switches. The first network 100 may also include arcs 120, 122, 124, 126 and 128 connecting the nodes to one another. As discussed above, for a network 100 in which the nodes are switches, the arcs may be trunks connecting pairs of switches. The second network 150 may include nodes 160, 162, 164 and 166, each of which may correspond to, and be replacing, one of the nodes 110, 112, 114 and 116 of the first network 100. As discussed above, the nodes of the second network 150 may be routers. The second network 150 may also include arcs 170, 172, 174, 176 and 178 connecting the nodes to one another; as discussed above, arcs of the second network may be IP paths connecting two routers. As is the case for the nodes, each of the arcs of the second network 150 may be replacing a corresponding one of the arcs of the first network 100. However, it is noted that a one-to-one correspondence between the nodes and arcs of the first network 100 and the second network 150 is not a requirement of the present invention.

Figure 1B:
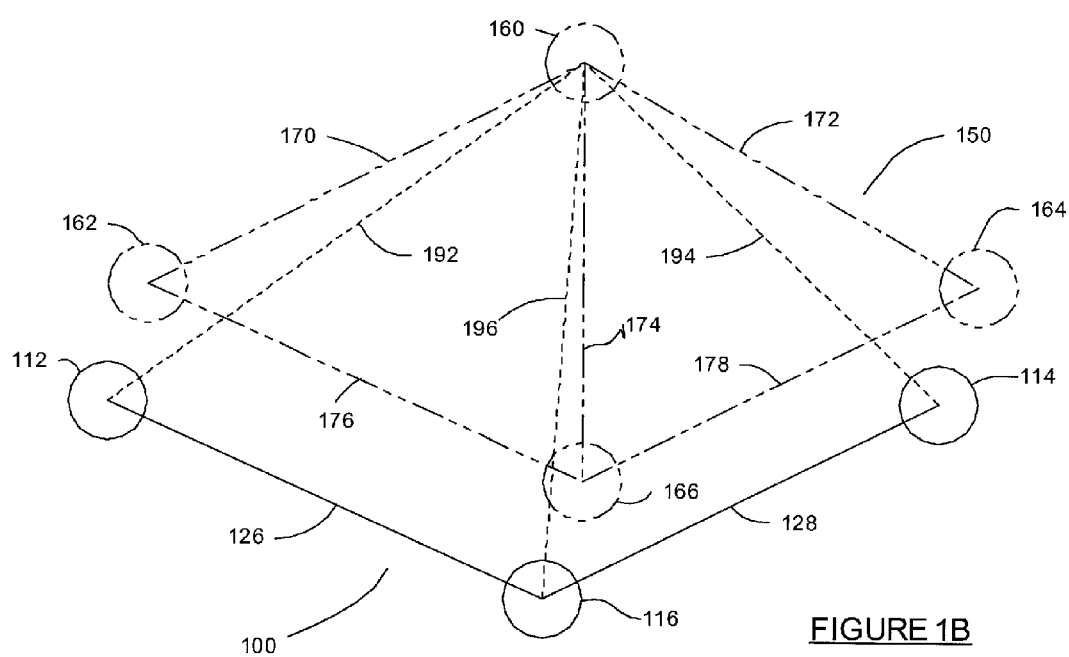

For both of the networks 100 and 150, each of the nodes may be the source and the destination of a quantity of network traffic. Because routing of traffic is predetermined, the capacity of each arc is known. Traffic that originates and terminates within the same network is routed within that network. However, during the process of migration, temporary links must be established in order to route traffic from one network to the other. For example, FIG. 1B illustrates the networks of FIG. 1A after node 110 of network 100 has been deloaded. Because node 160 of network 150 may correspond to node 110 of network 100, traffic that originated from or was sent to node 110 may originate from or be sent to node 160. In order to accomplish this, temporary arcs 192, 194 and 196 may need to be established to transmit traffic from, respectively, nodes 112, 114 and 116 of network 110 to and from node 160 of network 150.

As those of skill in the art will understand, the amount of traffic that the temporary arcs 192, 194 and 196 must be able to handle may be substantially equivalent to that handled by the arcs 122, 124 and 126 of the network 100. Further, those of skill in the art will understand that because each of the arcs may have a predetermined capacity that varies from that of the remaining arcs, the amount of temporary capacity required when node 110 is deloaded may be different from the amount that would be required if another of the nodes of network 100 had been deloaded. Additionally, as migration continues, the amount of temporary capacity required, both in total and at any given time, may depend on the sequence in which the nodes are deloaded. Thus, because building temporary capacity adds to the cost of the migration process, it is desirable to minimize the amount of required temporary capacity.

The factors to be considered in developing and executing a method or system for minimizing the temporary capacity requirements, thus, may include the set of nodes in the two networks, the set of arcs between the nodes, and the capacities of each of the arcs. This may be mathematically modeled as a linear arrangement problem of a graph (V, E, w) wherein V is the set of n vertices (i.e. nodes), E is the set of edges (i.e. arcs), and w is the vector of edge weights (i.e. arc capacities). A linear arrangement of this graph is a one-to-one function n: $V \rightarrow \{1,2,\ldots,n\}$. For all values of i from 1 to n, the function cut $K_i$ between nodes $p^{-1}(i)$ and $p^{-1}(i+1)$ may be defined as the sum of the capacities of all arcs with one endpoint in $p^{-1}(j)$ and the other in $p^{-1}(k)$ for all values of $j \leq i$ and $k > i$. The value $K_{max}$ of the largest cut may be defined as $K_{max}=\max \{K_1, K_2, \ldots, K_{n-1}\}$, where $K_i = \Sigma_{\{u,v\} \in E: \pi(u) \leq i \leq \pi(v)} w_{uv}$. The value $K_{sum}$, which is the sum of the cuts, may be defined as $$K_{sum} = \sum_{i=1}^{n-1} K_i,$$

where $K_i = \Sigma_{(u,v) \in E} |\pi(u) - \pi(v) \cdot w_{uv}|$. The exemplary embodiments of the present invention present methods for minimizing both $K_{sum}$ and $K_{max}$.

The exemplary embodiments of the present invention use a GRASP, which is a metaheuristic for finding approximate solutions to combinatorial optimization problems of the form $\min\{f(x)|x \in X\}$, where f is the objective function and X is a discrete set of feasible solutions (i.e., in this case, a discrete set of possible orders for a finite number of nodes).

Figure 2:
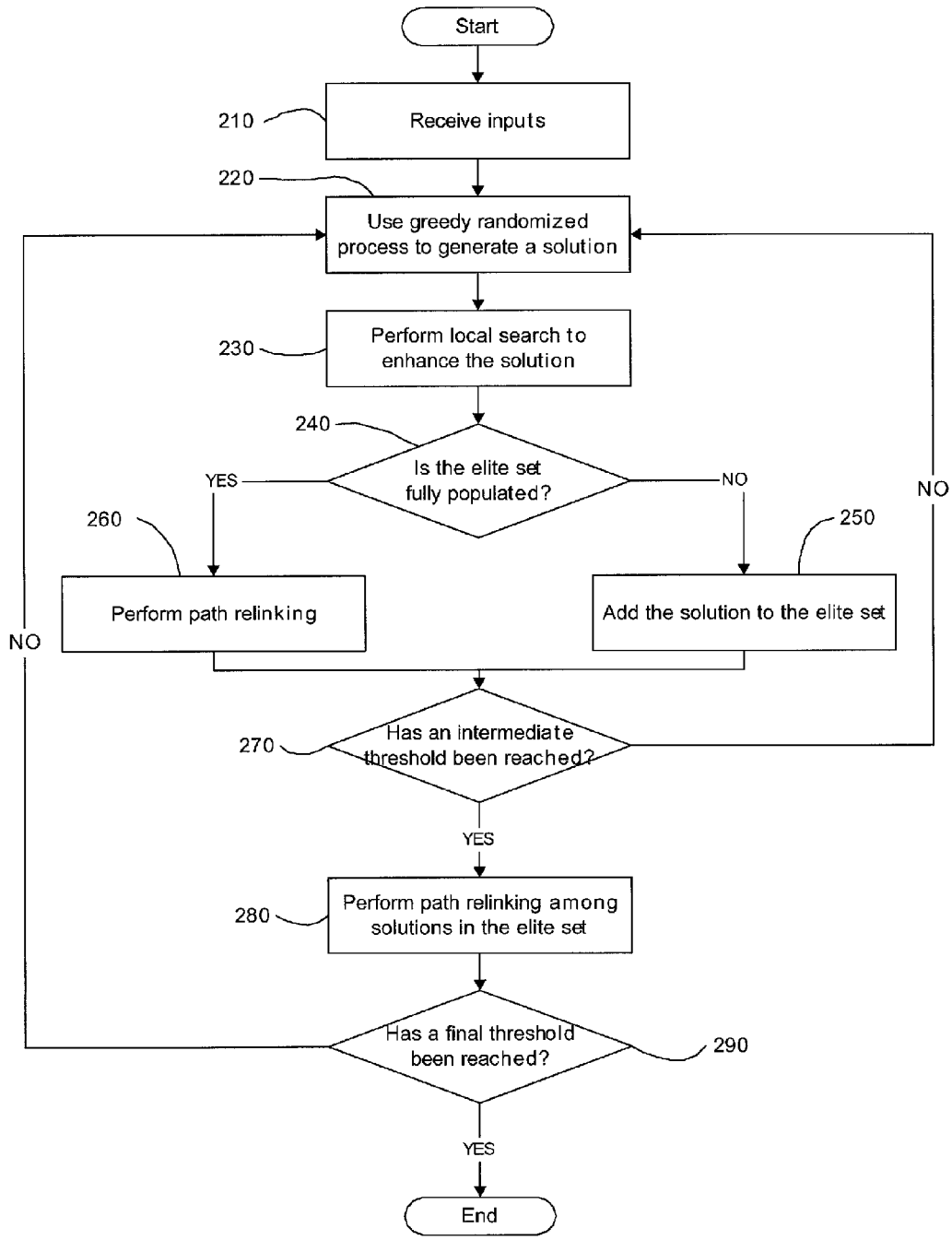
FIG. 2 shows an exemplary method according to the present invention.

FIG. 2 illustrates an exemplary method 200 according to the present invention. In step 210, a data set is received as input. As discussed above, a data set may include a set of nodes V, a set of arcs E, and a set of arc capacities w. The exemplary method may typically be executed as a computer program; thus, step 210 may be accomplished by, for example, manual data entry by a user, loading a database into the program, etc. The receipt of data in step 210 may also include input by a user of one or more parameters relating to the execution of the method 200. The parameters received may include a total number of iterations to perform and an intermediate number of iterations to perform.

In step 220, the nodes are ordered using a greedy randomized algorithm. In this type of algorithm, each of the nodes (e.g., for the network 100, nodes 110, 112, 114 and 116) is evaluated to determine the increase in the required temporary network capacity that would result from that node being the next added to the ordering. In a non-random greedy algorithm, the single node resulting in the smallest increase in capacity would be automatically selected. However, using a greedy randomized algorithm, a candidate list is selected from among the nodes being considered (e.g., the five nodes resulting in the smallest increase, the best 25% of the nodes for causing the smallest increase, etc.), and the node to be added to the ordering is randomly selected from the candidate list.

The greedy randomized algorithm then continues iterating, with each iteration operating substantially as described above. At each iteration, the nodes that have not yet been added to the ordering are evaluated to determine the increase in capacity that would result from their selection as the next to be added, and a selection is made based on the above-described greedy randomized process. The result of step 220 is a complete ordering of the nodes in the network.

Considering the greedy randomized algorithm in more depth, the heuristic begins by considering an initial sequence of k−1 vertices and adding the k-th vertex to a position where the increase in the objective function is minimized. The k-th vertex may be selected from any position in the arrangement. The set of k−1 vertices currently in the solution may be represented as $\{v_1, \ldots, v_{k-1}\}$, and the current cut values may be represented as $K=\{K_1, \ldots, K_{k-2}\}$. For a vertex x inserted at the next position i, the new set of cut values $K'=\{K_1', \ldots, K_{k-1}'\}$ may be calculated as:

$$K'_j = \begin{cases} K_j + \sum_{a=1}^{j} w_{xv_a} & j = 1, \ldots, i-1 \\ K_{j-1} + \sum_{a=j}^{k-1} w_{xv_a} & j = i, \ldots, k-1 \end{cases}$$

While such an expression may appear to require $O(k^2)$ operations to compute all k−1 cuts for one given position i, this may be O(k) operations by computing the cuts in the correct order and by storing the value of the corresponding cumulative sums $$S_- = \sum_{a=1}^{j} w_{xv_a} \text{ and } S_+ = \sum_{a=j}^{k-1} w_{xv_a}.$$

For example, to update the cuts positioned before i, i.e., $j=1, \ldots, i-1$, it may be convenient to begin by computing $K_1$ (i.e. j=1), because it suffices to add $S_- = w_{xv_1}$ to the current cut value. To update $K_2$, the cumulative sum is updated as $S_- \leftarrow S_- + w_{xv_2}$ and added to the current cut value. Thus, by starting from j=1, the current cumulative sum may be updated in O(1) operations, and therefore, each cut value may also be recomputed in O(1) operations. Similarly, for the cuts positioned after i (i.e., $j=i, \ldots, k-1$), the same time savings may be achieved by beginning with the last cut $K_{k-1}$ and decreasing j until the i-th cut is reached.

In step 230, a local search is performed on the ordering that is generated in step 220. In the local search, each potential pair of nodes within the ordering is considered in turn. For each pair of nodes, it is determined whether swapping the positions of the two nodes within the ordering would improve (i.e., reduce) the total required temporary network capacity. If so, the two nodes are swapped. Once there are no pairs of nodes whose swap reduces the total required capacity, the output of step 230 is an ordering of nodes that may be the same as that output by step 220 or may vary either slightly or significantly.

The construction procedure may output an ordering p(1), p(2), . . . , p(n), n-1 cut values $K_1, K_2, \ldots, K_{n-1}$, and for each v ∈ V, forward-weighted degrees $$f(v) = \sum_{u|\pi(u)>\pi(v)} w_{vu}$$

and backward-weighted degrees $$b(v) = \sum_{u|\pi(u)<\pi(v)} w_{vu}.$$

Local search examines all possible vertex swaps in the ordering to find an improvement of the objective function. In other words, it determines how the swap affects the cut values, and if it improves the objective function, then the swap is made.

If the two nodes swapped as described above are designated as x and y, where $x=\pi^{-1}(i)$, $y=\pi^{-1}(j)$, i<j, and f(x),b(x) (with respect to f(y),b(y)) are the forward and backward weighted degrees of x (with respect to y) before the swap. Only the cuts $K_i, \ldots, K_{j-1}$ will be affected by the swap. The nodes between x and y may be designated $e_{i+1}, \ldots, e_j$. The variation of the cut value $\Delta K(i+a)$ (a=0, . . . , j-i-1) may be expressed as:

$$\Delta K(i+a) = b(x) - f(x) + f(y) - b(y) + 2w_{xy} + 2\sum_{k=i+1}^{i+a} w_{xe_k} + 2\sum_{k=i+a+1}^{j-1} w_{ye_k}$$

Using the above expression, the execution time required to recompute the cut values for the above swap may be estimated in terms of the distance between x and y in the permutation array. Defining k=j-i+1, the time required to compute each new cut value may be O(k), while the time required to determine whether the swap improves the solution value may be $O(k^2)$. The execution time may be further improved by calculating $\Delta K(i+a+1)$ as a function of $\Delta K(i+a)$. This function may be expressed as: $\Delta K(i+a+1)=\Delta K(i+a)+2w_{xe_{i+a+1}}-2w_{ye_{i+a+1}}$. Thus, $\Delta K(i)$ may be computed in O(k) operations, and each of the remaining cuts may be computed in O(1) operations, resulting in all new cut values being computed in O(k) operations. Once the swap has been performed, the weighted forward and backward degrees f(k) and b(k) must be recomputed for values of k such that i=k=j.

In step 240, the method determines whether the elite set is fully populated. An elite set is a group of orderings that consists of the best orderings that have yet been determined by the algorithm. The size of the elite set may be set in advance (e.g., as a parameter specified by a user in step 210 of the exemplary method), and may be, for example, 10 orderings or 20 orderings. The elite set is initially empty. If the elite set is not yet fully populated, the method proceeds to step 250. If the elite set is fully populated, the method proceeds to step 260.

In step 250, the solution generated by the local search in step 230 is added to the elite set if it qualifies for inclusion. To qualify for inclusion in the elite set, a solution must be a good one (e.g., it must result in a small amount of required extra capacity), and it must be different from other solutions already existing within the elite set. Assuming both of these criteria are satisfied, the solution is added to the elite set and the method proceeds to step 270.

In step 260, path relinking is performed between the ordering obtained in step 230 and one of the orderings currently contained in the an elite set. The solution from the elite set to be used in this step is selected based on a weighted randomized selection. Each solution within the elite set is assigned a weight based on how much it differs from the ordering obtained in step 230. One solution is then selected, with solutions that differ more from the input ordering more likely to be selected.

Path relinking is a process wherein a pair of orderings of nodes are compared to one another. A set of changes required to be made to a first of the two orderings in order to transform it into the second of the two orderings is considered; the output of the path relinking process is the intermediate ordering along the path that provides the minimum value of the objective function.

For example, consider two orderings of the nodes of the network 100, a first ordering {110, 114, 116, 112} and a second ordering {114, 112, 110, 116}. One of the orderings was output by step 230, while the other was selected from the elite set; the worse of the two orderings is selected as the starting point, while the better of the two is selected as a guiding solution. Each step in the path between the first ordering and the second ordering will put one of the nodes in the proper place for the second ordering. For example, one path between the above orderings might be:

{110, 114, 116, 112}

{114, 110, 116, 112}

{114, 112, 116, 110}

{114, 112, 110, 116}

The objective function is considered for the two intermediate orderings, and if one of the intermediate orderings is better than the first ordering, which was the output of step 220, then it replaces the first ordering. If the intermediate orderings are not better than the first ordering, then the first ordering is the output of the path relinking process.

Those of skill in the art will understand that there are multiple possible paths between two orderings of a sufficiently large group of nodes. Referring to the example above, the first step in path relinking could be to put any of the nodes 110, 112, 114 or 116 in its proper place in the target order. Each of the four possible first steps may result in its own attendant increase or decrease in the objective function. In one exemplary implementation, which is similar to the greedy ordering process described above, the potential step with the best possible result (i.e., the greatest decrease or the smallest increase in the objective function) may be made. In another exemplary implementation, which is similar to the greedy randomized process described above, a candidate list may be formed consisting of a number of the best possible steps, and a move may then be randomly selected from that group.

The above description refers to a "forward" path relinking process; in other words, one wherein the worse of the two solutions being considered is used as a starting point and the better of the two is used as a guiding solution. Other exemplary implementations may use "backward" path relinking, wherein the better of the two solutions is used as a starting point and the worse is used as a guiding solution. Other exemplary implementations may truncate the path relinking process in order to save computation time; truncation may occur, for example, halfway through the process, after a fixed number of steps, once a target result has been achieved, etc. In still other exemplary implementations, "mixed" path relinking may be used. In mixed path relinking, forward and backward steps may alternate one step at a time. Finally, in still other implementations, mixed path relinking may be truncated as described above.

Once path relinking is complete, the solution obtained is tested for inclusion into the elite set. The solution is promoted into the elite set if it meets one of two criteria. First, the solution becomes a part of the elite set if it is better than the best existing solution in the elite set. Second, the solution becomes a part of the elite set if it is better than the worst existing solution in the elite set, and is sufficiently different from all existing solutions in the elite set. In either case, if the solution is added to the elite set, the worst existing solution is removed from the elite set in order to maintain a fixed size. After this decision, the method proceeds to step 270.

In step 270, the method determines whether enough iterations have passed in order to perform intermediate path relinking within the elite set (i.e., the intermediate number of iterations to perform as selected in step 210). If enough iterations have not yet taken place, the method returns to step 220. If enough iterations have taken place, the method continues to step 280.

In step 280, path relinking is performed among solutions within the elite set; this process may be referred to as "elite set intensification" or "evolutionary path relinking." This may be performed among all pairs of solutions within the elite set, or among a subset of all possible pairs of solutions. In one embodiment, the best two solutions within the elite set are selected, and are then path relinked with one another as well as with each of the remaining solutions within the elite set. Each new solution obtained by such path relinking is tested for inclusion into a new, "second generation" elite set, and is included in the new elite set if it meets the criteria for inclusion into an elite set as described above.

As should be apparent, the number of possible solutions thus considered may be twice the number of solutions in the "first generation" elite set (for embodiments where the best two solutions in the first generation elite set are compared to the remaining solutions), may be the square of the number of solutions in the first generation of the elite set (for embodiments where each solution in the first generation of the elite set is compared to every other solution), or may be some other function of the number of solutions in the first generation elite set (for other embodiments). However, in order to keep processing times reasonable, it is desirable for the number of solutions in the second generation elite set to be the same as the number in the first generation elite set. Thus, once the target number of solutions have been added to the second generation elite set, newly considered solutions are evaluated in the same way as described above in step 260.

Once all desired pairs have been considered and the second generation elite set is fully populated, it is compared to the first generation elite set. If the best solution in the second generation elite set is an improvement over the best solution in the first generation elite set (i.e., if it results in less required added capacity), the process is repeated as above. Path relinking is performed among pairs of solutions in the second generation elite set to form a third generation elite set, followed by later generations if necessary. However, if there is no improvement from the previous generation to the next generation (e.g., from the second generation to the third generation), the new generation (e.g., the third generation) is used as the elite set and step 280 concludes.

In step 290, it is determined whether enough iterations have passed for the method to terminate. In one implementation of the present invention, this number of iterations may be preselected, such as by user input during step 210. In another implementation, iterations may continue until a certain target has been reached. If not enough iterations have passed, the method returns to step 220 to perform more GRASP iterations and generate new solutions. If enough iterations have passed, the method terminates; the output is the best solution contained in the elite set. The output may then be returned to a user (e.g., by display on a monitor or other display device, by printing, etc.).

The exemplary embodiments of the present invention may enable a determination to be made of an optimal ordering for the deloading of nodes during network migration. The optimal ordering may then be used to minimize the required temporary network capacity that must be constructed, thus reducing the cost of the migration process. Total capacity reduction achieved may be on the order of a 30% improvement over a baseline solution.

The present invention has been described with reference to the above specific exemplary embodiments. However, those of ordinary skill in the art will recognize that the same principles may be applied to other embodiments of the present invention, and that the exemplary embodiments should therefore be read in an illustrative, rather than limiting, sense.

What is claimed is:

1. A method of transforming an ordered list of nodes of a network into one of a plurality of elite ordered lists, the ordered list corresponding to a deloading sequence of the nodes from the network, the deloading sequence including a temporary capacity requirement, each of the elite ordered lists corresponding to an elite deloading sequence including an elite temporary capacity requirement, comprising:
   generating at least one intermediate ordered list corresponding to an intermediate deloading sequence including an intermediate temporary capacity requirement;
   selecting one of the intermediate ordered list and the ordered list based on a comparison of the intermediate temporary capacity requirement and the temporary capacity requirement; and
   replacing one of the elite ordered lists with the one of the intermediate ordered list and the ordered list if a value corresponding to one of the intermediate temporary capacity requirement and the temporary capacity requirement is less than a lowest value of the elite temporary capacity requirements.

2. The method of claim 1, further comprising:
   replacing one of the elite ordered lists with the one of the intermediate ordered list and the ordered list if the value corresponding to one of the intermediate temporary capacity requirement and the temporary capacity requirement is less than a greatest value of the elite temporary capacity requirements and the one of the intermediate ordered list and the ordered list differs from each of the elite ordered lists by at least a predetermined value.

3. The method of claim 1, wherein the transforming is based on a greedy randomized process.

4. The method of claim 1, further comprising:
transforming a first one of the elite ordered lists into each of the remaining ones of the elite ordered lists, the transforming generating at least one intermediate elite ordered list for each of the remaining ones of the elite ordered lists, each of intermediate elite ordered lists corresponding to an intermediate elite deloading sequence including an intermediate elite temporary capacity requirement.

5. The method of claim 4, further comprising:
comparing the lowest value of the elite temporary capacity requirements to a lowest value of the intermediate elite temporary capacity requirements; and
outputting the intermediate elite ordered list corresponding to the lowest value of the intermediate elite temporary capacity requirements, if the lowest values are equal.

6. The method of claim 5, further comprising:
repeating the transforming of claim 4 for the intermediate elite ordered lists if the lowest value of the elite temporary capacity requirements is greater than the lowest value of the intermediate elite temporary capacity requirements.

7. The method of claim 6, wherein a number of times the repeating is performed is limited by a predefined threshold.

8. The method of claim 1, further comprising:
generating an original ordered list of nodes, the original ordered list corresponding to an original deloading sequence including an original temporary capacity requirement;
modifying the original ordered list to generate a modified ordered list of the nodes, the modified ordered list corresponding to a modified deloading sequence including a modified temporary capacity requirement; and
selecting, as the ordered list, one of the original ordered list and the modified ordered list based on a comparison of the original temporary capacity requirement and the modified temporary capacity requirement.

9. The method of claim 8, wherein the selecting is based on the one of the original ordered list and the modified ordered list that corresponds to a lower value of one of the original temporary capacity requirement and the modified temporary capacity requirement.

10. The method of claim 8, wherein the generating is based on a greedy randomized search procedure.

11. A system to transform an ordered list of nodes of a network into one of a plurality of elite ordered lists, the ordered list corresponding to a deloading sequence of the nodes from the network, the deloading sequence including a temporary capacity requirement, each of the elite ordered lists corresponding to an elite deloading sequence including an elite temporary capacity requirement, comprising:
a memory storing the ordered list of nodes and the elite ordered lists; and
a processor generating at least one intermediate ordered list corresponding to an intermediate deloading sequence including an intermediate temporary capacity requirement, selecting one of the intermediate ordered list and the ordered list based on a comparison of the intermediate temporary capacity requirement and the temporary capacity requirement, and replacing one of the elite ordered lists with the one of the intermediate ordered list and the ordered list if a value corresponding to one of the intermediate temporary capacity requirement and the temporary capacity requirement is less than a lowest value of the elite temporary capacity requirements.

12. The system of claim 11, wherein the processor replaces one of the elite ordered lists with the one of the intermediate ordered list and the ordered list if the value corresponding to one of the intermediate temporary capacity requirement and the temporary capacity requirement is less than a greatest value of the elite temporary capacity requirements and the one of the intermediate ordered list and the ordered list differs from each of the elite ordered lists by at least a predetermined value.

13. The system of claim 11, wherein the processor transforms the ordered list based on a greedy randomized process.

14. The system of claim 11, wherein the processor transforms a first one of the elite ordered lists into each of the remaining ones of the elite ordered lists, the transforming generating at least one intermediate elite ordered list for each of the remaining ones of the elite ordered lists, each of intermediate elite ordered lists corresponding to an intermediate elite deloading sequence including an intermediate elite temporary capacity requirement.

15. The system of claim 14, wherein the processor compares the lowest value of the elite temporary capacity requirements to a lowest value of the intermediate elite temporary capacity requirements and outputs the intermediate elite ordered list corresponding to the lowest value of the intermediate elite temporary capacity requirements, if the lowest values are equal.

16. The system of claim 15, wherein the processor repeats the transforming of claim 14 for the intermediate elite ordered lists if the lowest value of the elite temporary capacity requirements is greater than the lowest value of the intermediate elite temporary capacity requirements.

17. The system of claim 11, wherein the processor generates an original ordered list of nodes, the original ordered list corresponding to an original deloading sequence including an original temporary capacity requirement, modifies the original ordered list to generate a modified ordered list of the nodes, the modified ordered list corresponding to a modified deloading sequence including a modified temporary capacity requirement and selects, as the ordered list, one of the original ordered list and the modified ordered list based on a comparison of the original temporary capacity requirement and the modified temporary capacity requirement.

18. The system of claim 17, wherein the processor selects the ordered list based on the one of the original ordered list and the modified ordered list that corresponds to a lower value of one of the original temporary capacity requirement and the modified temporary capacity requirement.

19. The system of claim 17, wherein the processor generates the original ordered list of nodes based on a greedy randomized search procedure.

20. A memory storing a set of instructions executable by a processor to transform an ordered list of nodes of a network into one of a plurality of elite ordered lists, the ordered list corresponding to a deloading sequence of the nodes from the network, the deloading sequence including a temporary capacity requirement, each of the elite ordered lists corresponding to an elite deloading sequence including an elite temporary capacity requirement, the set of instructions being operable to:
generate at least one intermediate ordered list corresponding to an intermediate deloading sequence including an intermediate temporary capacity requirement;

select one of the intermediate ordered list and the ordered list based on a comparison of the intermediate temporary capacity requirement and the temporary capacity requirement; and replace one of the elite ordered lists with the one of the intermediate ordered list and the ordered list if a value corresponding to one of the intermediate temporary capacity requirement and the temporary capacity requirement is less than a lowest value of the elite temporary capacity requirements.

* * * * *